(12) United States Patent
Hu

(10) Patent No.: US 11,517,794 B2
(45) Date of Patent: Dec. 6, 2022

(54) METHOD OF MANUFACTURING SEAMLESS INFLATABLE BALL

(71) Applicant: Jui-Yu Hu, Taichung (TW)

(72) Inventor: Jui-Yu Hu, Taichung (TW)

(*) Notice: Subject to any disclaimer, the term of this patent is extended or adjusted under 35 U.S.C. 154(b) by 387 days.

(21) Appl. No.: 16/677,935

(22) Filed: Nov. 8, 2019

(65) Prior Publication Data

US 2021/0138309 A1    May 13, 2021

(51) Int. Cl.
  *A63B 45/00* (2006.01)
  *A63B 41/08* (2006.01)
  *B29D 22/04* (2006.01)
  *B29C 33/42* (2006.01)
  *B29D 22/02* (2006.01)
  *B29L 31/54* (2006.01)

(52) U.S. Cl.
  CPC .............. *A63B 45/00* (2013.01); *A63B 41/08* (2013.01); *B29C 33/424* (2013.01); *B29D 22/02* (2013.01); *B29D 22/04* (2013.01); *B29L 2031/54* (2013.01)

(58) Field of Classification Search
  None
  See application file for complete search history.

(56) References Cited

U.S. PATENT DOCUMENTS

| 7,862,757 | B2 | 1/2011 | Hu | |
|---|---|---|---|---|
| 2001/0005702 | A1* | 6/2001 | Dobrounig | A63B 41/08 473/599 |
| 2003/0181272 | A1* | 9/2003 | Lee | A63B 41/00 473/604 |
| 2006/0040012 | A1* | 2/2006 | Su | B29C 45/14819 425/470 |

* cited by examiner

*Primary Examiner* — Jacob T Minskey
*Assistant Examiner* — Adrien J Bernard
(74) *Attorney, Agent, or Firm* — Alan D. Kamrath; Karin L. Williams; Mayer & Williams PC

(57) ABSTRACT

A method of manufacturing a seamless inflatable ball contains: 1) inflating air into a preformed body so as to form a spherical body and covering a medium layer on the spherical body so as to form a semi-finished part; 2) forming a fluidic surface material on the medium layer of the semi-finished part in a predetermined thickness so as to produce a spherical portion with a covering layer; 3) placing the spherical portion into two ball molds; and 4) partially discharging air out of the spherical body and inflating the air into the spherical body repeatedly. In the step 3), the spherical portion is clamped in the two ball molds, and after the fluidic surface material is dried or is solidified to form a solid layer on the spherical portion, the spherical portion is removed from the two ball molds, thus forming a sphere.

5 Claims, 10 Drawing Sheets

METHOD OF MANUFACTURING SEAMLESS INFLATABLE BALL

FIELD OF THE INVENTION

The present invention relates to a ball having a spherical body, and more particularly to a method of manufacturing a seamless inflatable ball.

BACKGROUND OF THE INVENTION

A conventional air inflatable ball contains a spherical body in which air is inflated. The spherical body includes a surface layer made of leather, plastic, rubber or artificial leather. The surface layer is adhered or sewed on the spherical body, thus causing complicated connection. In addition, the surface layer is detachable from the spherical body easily, and water flows into the spherical body through the surface layer easily.

To solve above-mentioned problem, a seamless inflatable ball is developed, wherein a covering layer is connected on the spherical body and is made of plastic, rubber or articular leather in a heat melting manner so as to form a semi-finished body, and the semi-finished body is placed into two ball molds so that the covering layer is connected on the spherical body tightly.

A manufacturing method for a seamless manmade leather ball is disclosed in U.S. Pat. No. 7,862,757. The seamless manmade leather ball includes a preformed body in a semi-sphere shape, and the preformed body has a first adhesion sheet and a second adhesion sheet which are fitted on a spherical body, and the spherical body is placed into two ball molds to be shaped, wherein a surface layer is covered on the spherical body. However, a connection gap between the first adhesion sheet and the second adhesion sheet is heated and is pressed so as to form the seamless manmade leather ball. Nevertheless, air cannot be discharged out of the seamless manmade leather ball, and the surface layer is removed from the spherical body easily.

In addition, the gap cannot be eliminated and an outer surface of the seamless manmade leather ball is rough, thus the seamless manmade leather ball cannot roll smoothly.

The present invention has arisen to mitigate and/or obviate the afore-described disadvantages.

SUMMARY OF THE INVENTION

The primary aspect of the present invention is to provide a method of manufacturing a seamless inflatable ball which connects the spherical portion, the medium layer, the covering layer, and the solid layer securely so that the covering layer and the solid layer are not removed from the spherical body.

The secondary aspect of the present invention is to provide a method of manufacturing a seamless inflatable ball which contains the medium layer configured to buffer the spherical body, the covering layer, and the solid layer, thus obtaining the sphere securely.

A further aspect of the present invention is to provide method of manufacturing a seamless inflatable ball in which fluidic surface material is pushed into multiple gaps of the medium layer, the medium layer is connected with the spherical body tightly, the solid layer is fixedly formed on the spherical body, and the decoration face is shaped on the sphere obviously.

Another aspect of the present invention is to provide method of manufacturing a seamless inflatable ball by which the fluidic surface material is formed on the spherical portion and the medium layer based on spheres of different shapes (such as football, volleyball, basketball, handball, and football, etc.) and sizes.

To obtain above-mentioned aspects, a method of manufacturing a seamless inflatable ball provided by the present invention contains steps of:

1) inflating air into a preformed body so as to form a spherical body and covering a medium layer on the spherical body so as to form a semi-finished part, wherein the medium layer is made of weaving material with a predetermined thickness, and wherein the semi-finished part absorbs fluids on the medium layer;

2) forming a fluidic surface material on the medium layer of the semi-finished part in a predetermined thickness so as to produce a spherical portion with a covering layer;

3) placing the spherical portion into two ball molds wherein the two ball molds have multiple indentations or patterns formed on two inner walls of the two ball molds respectively, such that the spherical portion is clamped in the two ball molds, and after the fluidic surface material is dried or is solidified to form a solid layer on the spherical portion, the spherical portion is removed from the two ball molds, thus forming a sphere; and 4) partially discharging air out of the spherical body and inflating the air into the spherical body repeatedly so as to expand the spherical portion and to force the two inner walls of the ball molds by using the spherical portion, such that the fluidic surface material is pushed into the multiple gaps of the medium layer.

BRIEF DESCRIPTION OF THE DRAWINGS

FIG. 1G is an amplified perspective view of the sphere finished according to the preferred embodiment of the present invention.

DETAILED DESCRIPTION OF THE PREFERRED EMBODIMENTS

Figure 1:
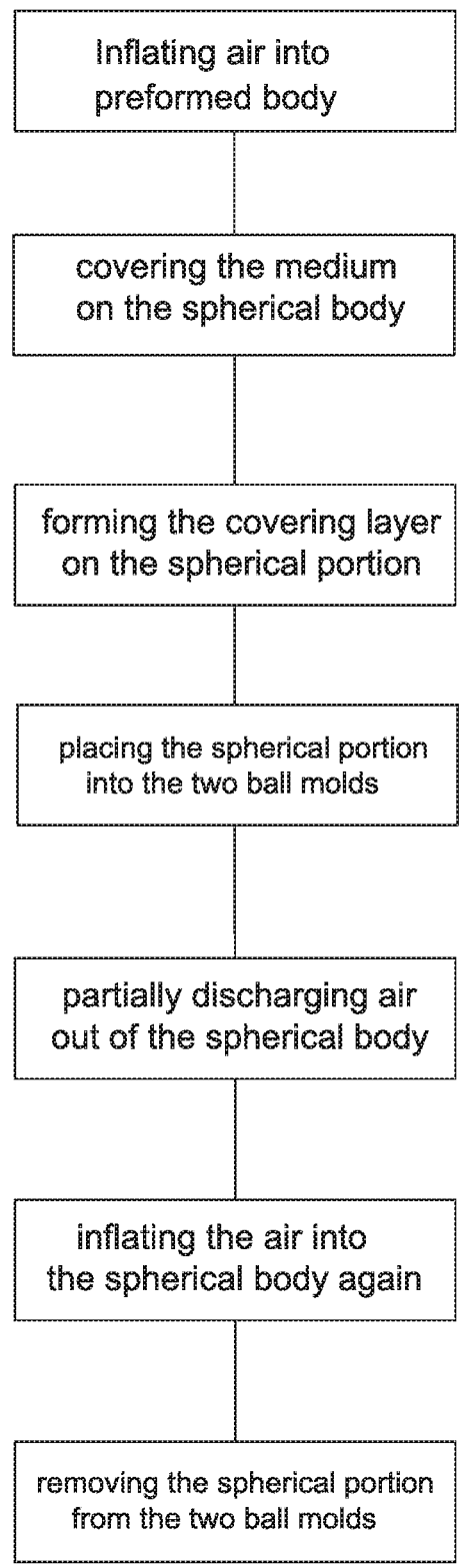
FIG. 1 is a flow chart of a method of manufacturing a seamless inflatable ball according to a preferred embodiment of the present invention.
Figure 1A:
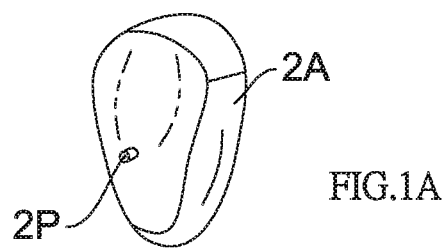
FIG. 1A is a perspective view showing the assembly of a preformed body of the seamless inflatable ball according to the preferred embodiment of the present invention.
Figure 1B:
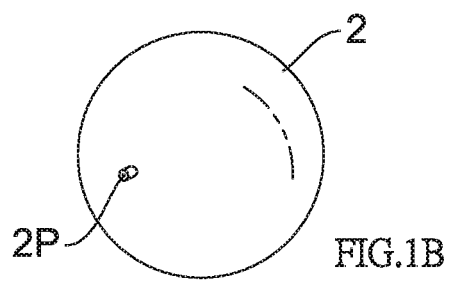
FIG. 1B is a perspective view showing the assembly of a spherical body of the seamless inflatable ball according to the preferred embodiment of the present invention.
Figure 1C:
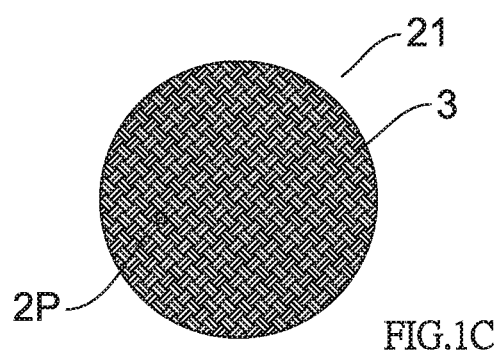
FIG. 1C is a perspective view showing a medium layer covering on the spherical body of the seamless inflatable ball according to the preferred embodiment of the present invention.

With reference to FIGS. 1 and 2, a method of manufacturing a seamless inflatable ball according to a preferred embodiment of the present invention comprises a step of:

1) inflating air into a preformed body 2A (as shown in FIG. 1A) from an air inflation nozzle 2P so as to form a spherical body 2 (as shown in FIG. 1B); covering a medium layer 3 on the spherical body 2 to form a semi-finished part 21 (as illustrated in FIG. 1C), wherein the medium layer 3 is made of weaving material with a predetermined thickness, and the medium layer 3 is flexible and has multiple gaps formed thereon, wherein the semi-finished part 21 absorbs fluids on the medium layer 3.

The weaving material of the medium layer 3 of the semi-finished part 21 is yarns which are winded, weaved, adhered or covered in a fabric or in a mesh shape on the semi-finished part 21. Covering the medium layer 3 on the semi-finished part 21 is a prior art, so further remarks are omitted.

Figure 1D:
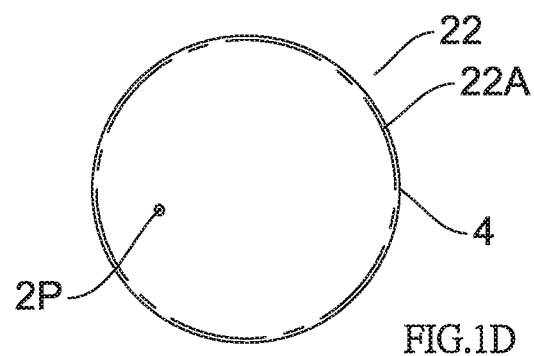
FIG. 1D is a perspective view showing the assembly of a spherical portion of the seamless inflatable ball according to the preferred embodiment of the present invention.
Figure 1E:
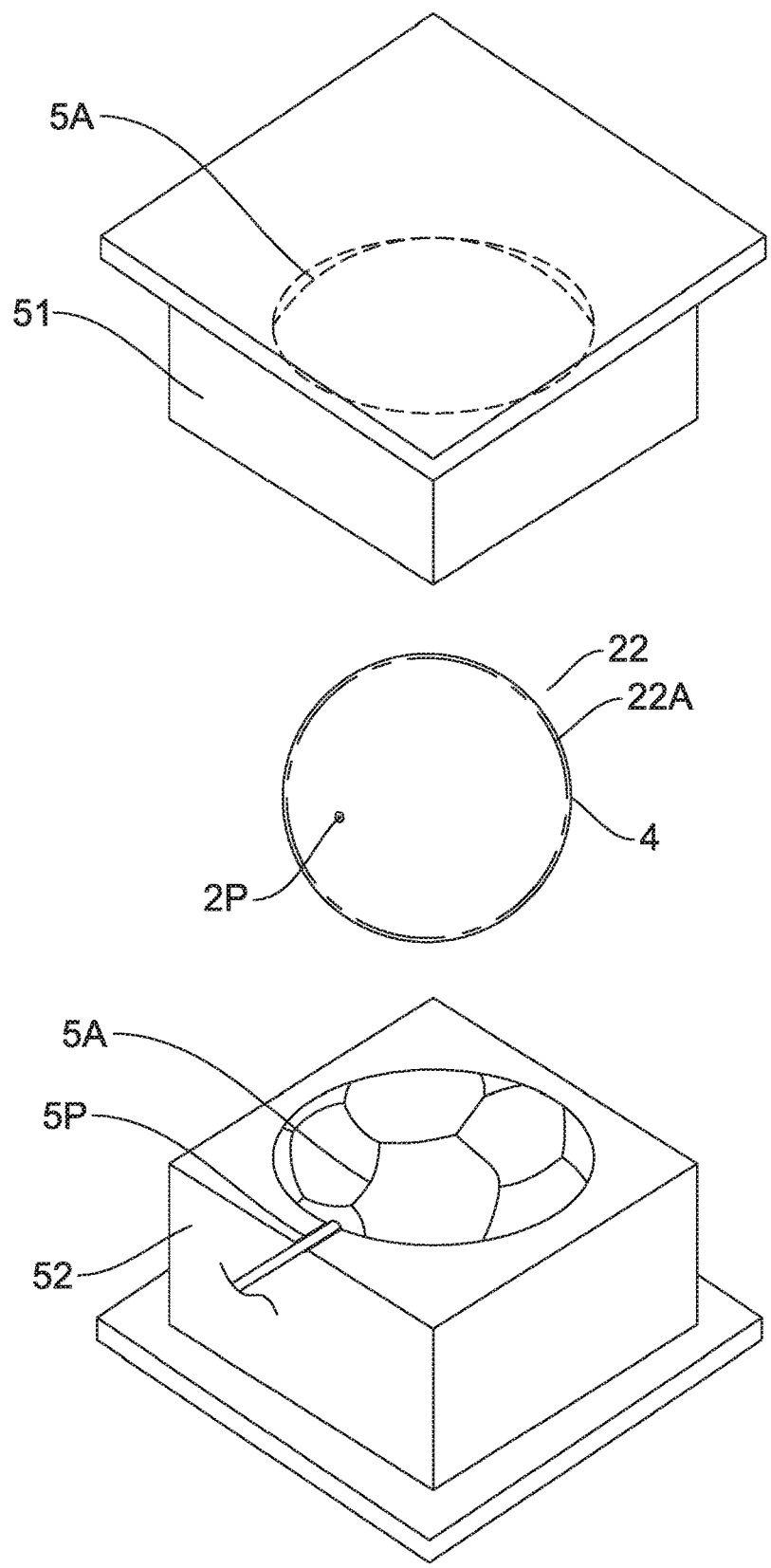
FIG. 1E is a perspective view showing the spherical portion being placed into two ball molds according to the preferred embodiment of the present invention.
Figure 1F:
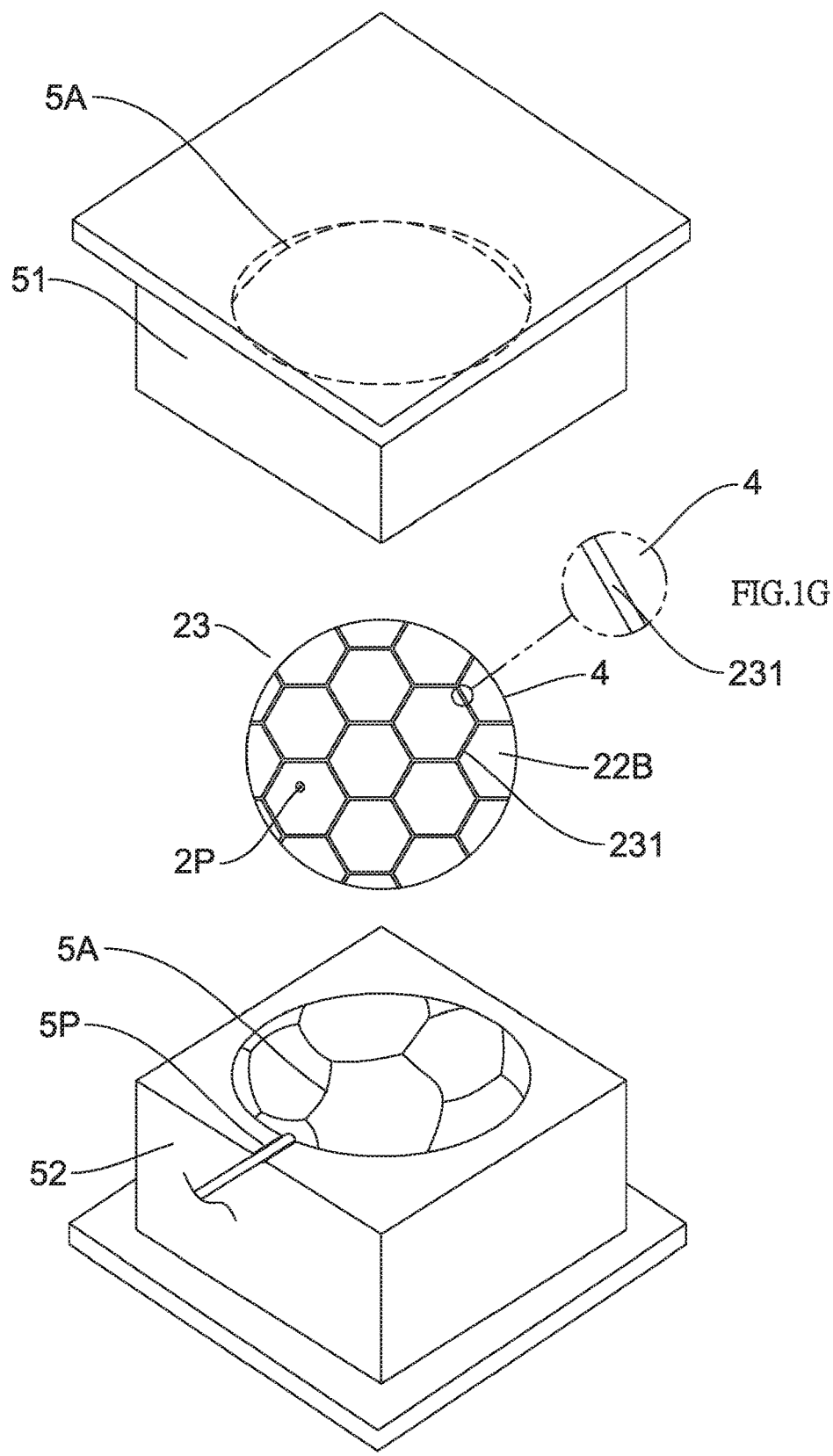
FIG. 1F is a perspective view showing a sphere being finished and removed from the two ball molds according to the preferred embodiment of the present invention.
Figure 2A:
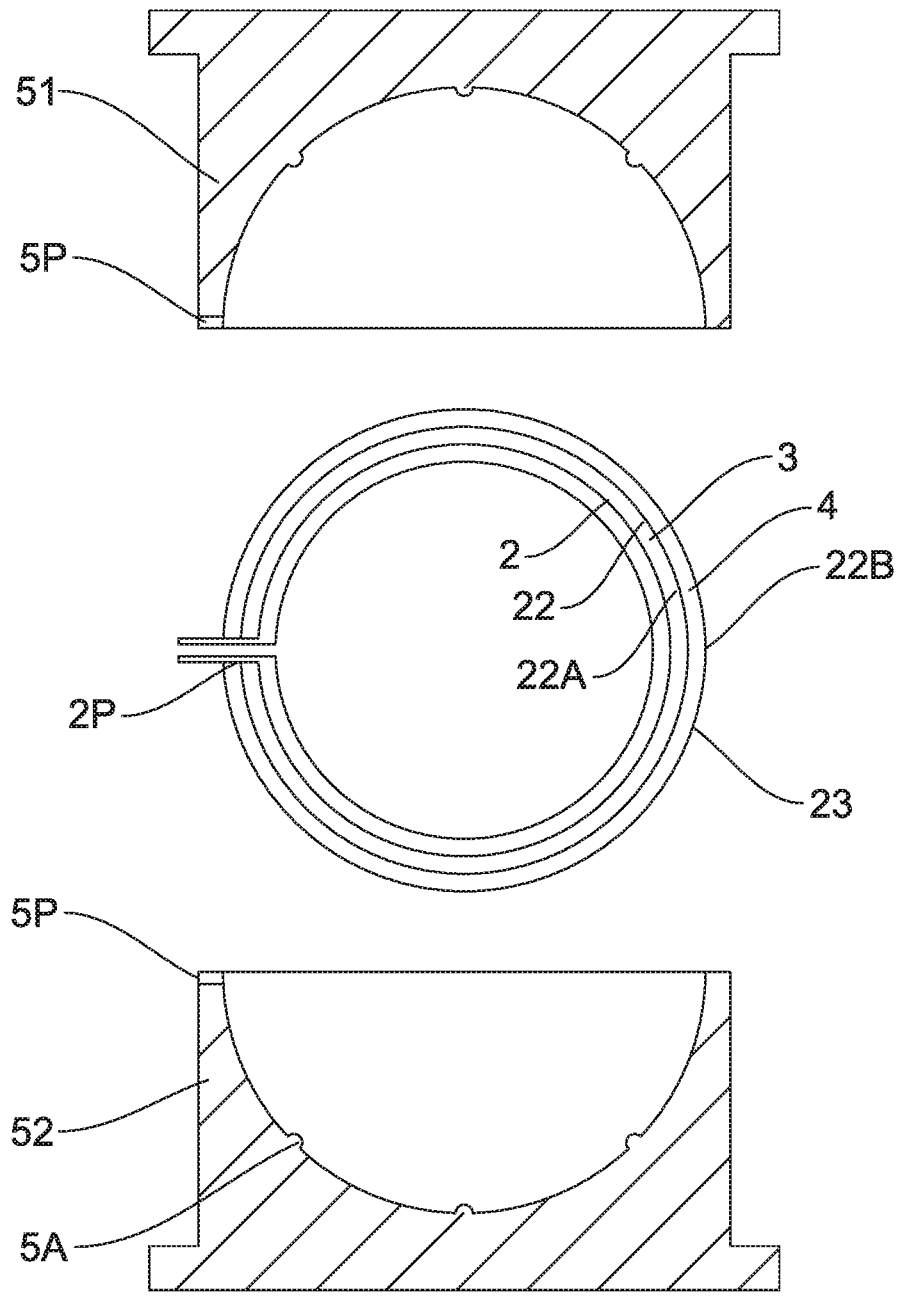
FIG. 2A is a cross sectional view showing the spherical portion being placed into two ball molds according to the preferred embodiment of the present invention.
Figure 2B:
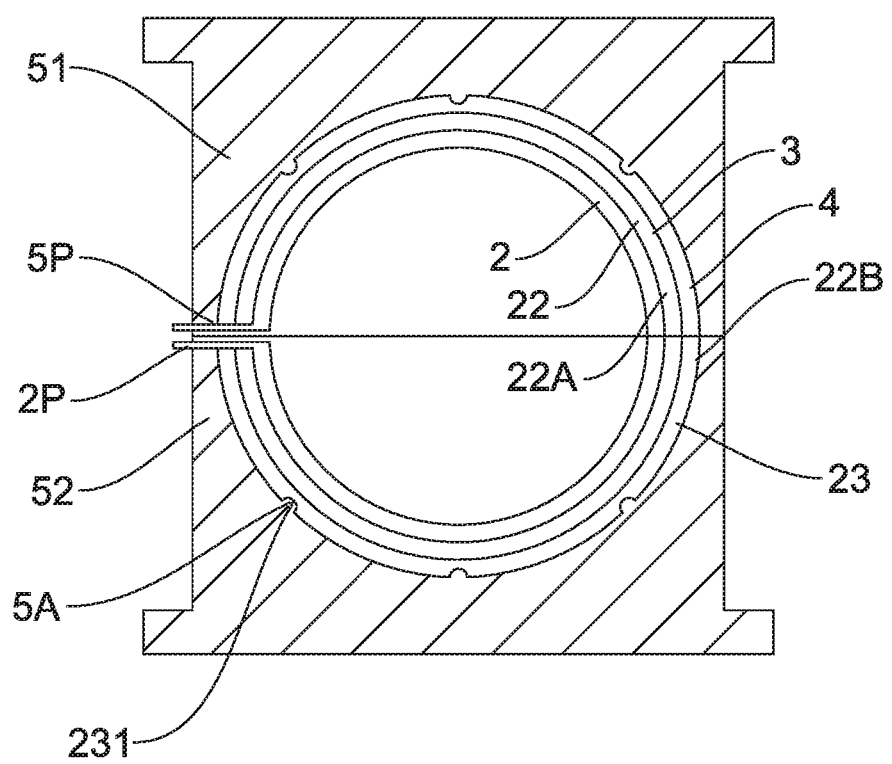
FIG. 2B is a cross sectional showing the spherical portion being heated in the two ball molds according to the preferred embodiment of the present invention.
Figure 2C:
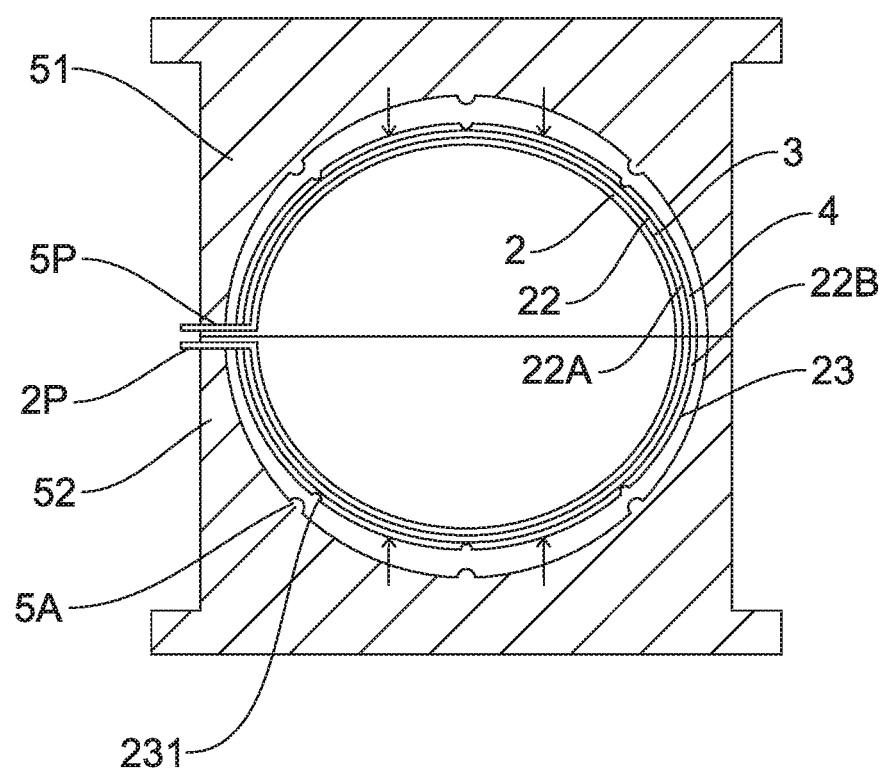
FIG. 2C is a cross sectional showing discharging air out of the spherical portion according to the preferred embodiment of the present invention.
Figure 2D:
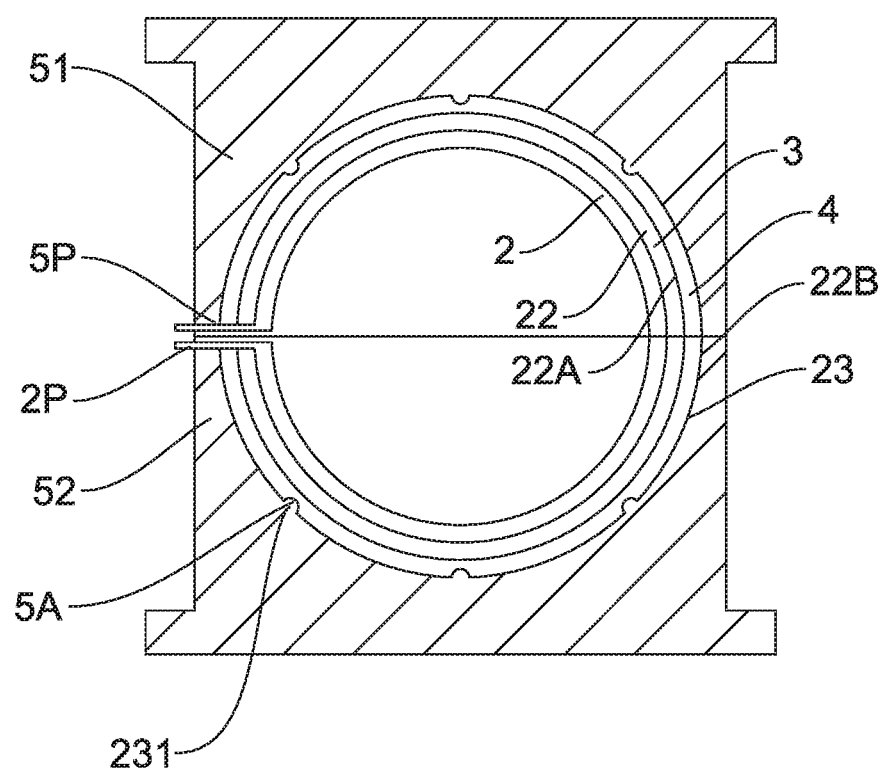
FIG. 2D is another cross sectional showing the spherical portion being heated again in the two ball molds according to the preferred embodiment of the present invention.
Figure 2E:
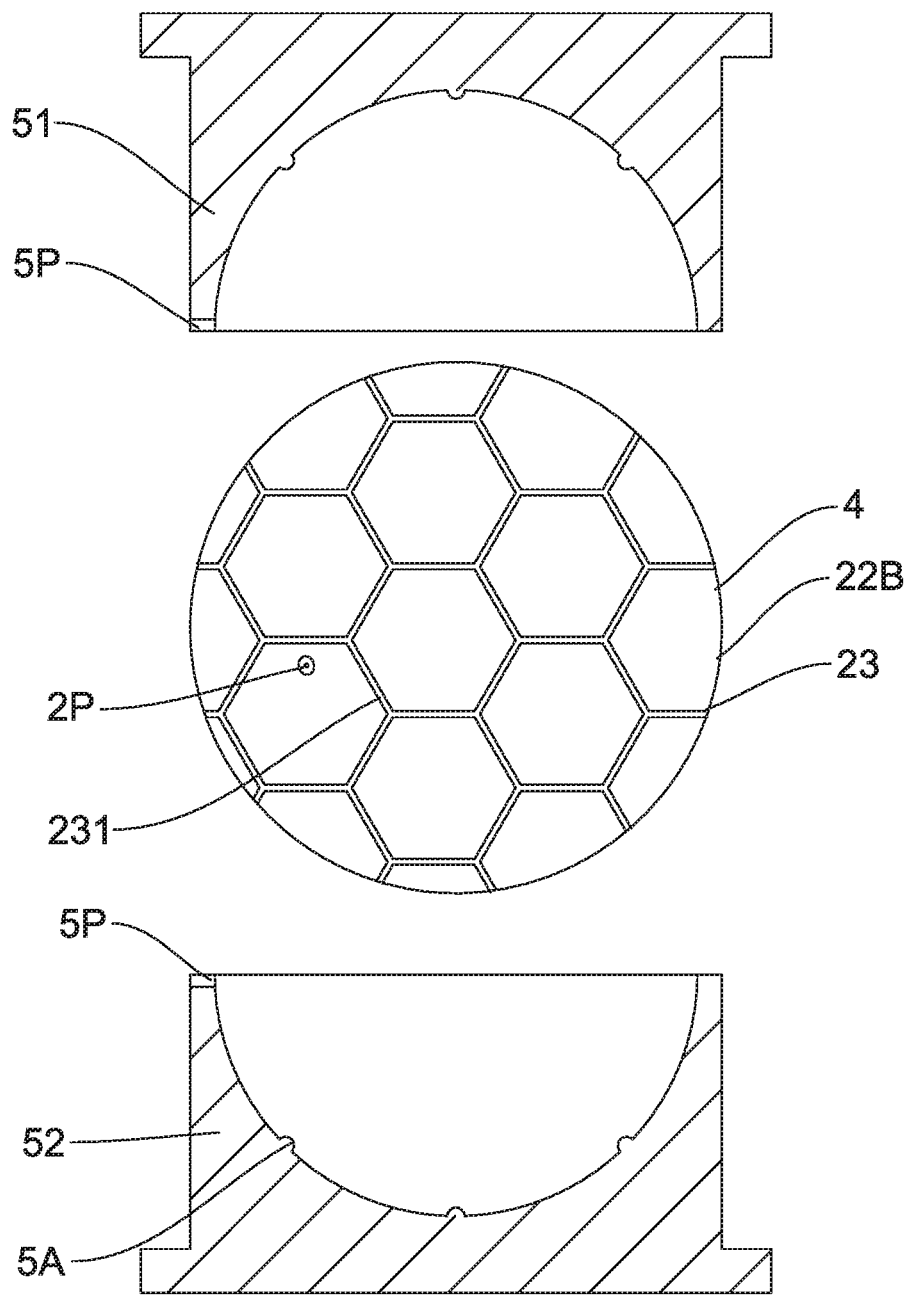
FIG. 2E is a cross sectional view showing the sphere being finished and removed from the two ball molds according to the preferred embodiment of the present invention.

The method of the present invention further comprises steps of:

2) forming a fluidic surface material 4 on the medium layer 3 of the semi-finished part 21 in a predetermined thickness so as to produce a spherical portion 22 with a covering layer 22A (as shown in FIG. 1D);

wherein the fluidic surface material 4 is formed on the medium layer 3 in any one of a soaking manner, a spraying manner, and a coating manner, and forming the fluidic surface material layer 4 on the medium layer 3 is a prior art, so further remarks are omitted;

3) placing the spherical portion 22 into two ball molds 51, 52, wherein the two ball molds 51, 52 have multiple indentations or patterns 5A formed on two inner walls of the two ball molds 51, 52 respectively (as shown in FIG. 1E and FIG. 2A), such that the spherical portion 22 is clamped in the two ball molds 51, 52 (as shown in FIG. 2B), and after the fluidic surface material 4 is dried or is solidified to form a solid layer 22B on the spherical portion 22, the spherical portion 22 is removed from the two ball molds 51, 52, thus forming a sphere 23 (as shown in FIG. 1F and FIG. 2E);

wherein the two ball molds 51, 52 press the spherical portion 22 so as to form a decoration face 231 on the sphere 23 by using the multiple indentations or patterns 5A;

wherein the covering layer 22A is pressed or heated by the two ball molds 51, 52 so that the covering layer 22A is shaped and is connected with the medium layer 3 securely;

4) forming an air intake 5P on the spherical portion 22 after placing the spherical portion 22 into two ball molds 51, 52 (as illustrated in FIG. 2B), wherein the air intake 5P corresponds to the air inflation nozzle 2P so as to partially discharge air out of the spherical body 2 (as shown in FIG. 2C), and the air is inflated into the spherical body 2 (as illustrated in FIG. 2D) repeatedly so as to expand the spherical portion 22 (as shown in FIG. 2B and FIG. 2D), and the spherical portion 22 forces the two inner walls of the ball molds 51, 52, such that the fluidic surface material 4 is pushed into the multiple gaps of the medium layer 3, the medium layer 3 is connected with the spherical body 2 tightly, the solid layer 22B is formed on the spherical body 2 fixedly, and the decoration face 231 is shaped on the sphere 23 obviously.

Figure 3:
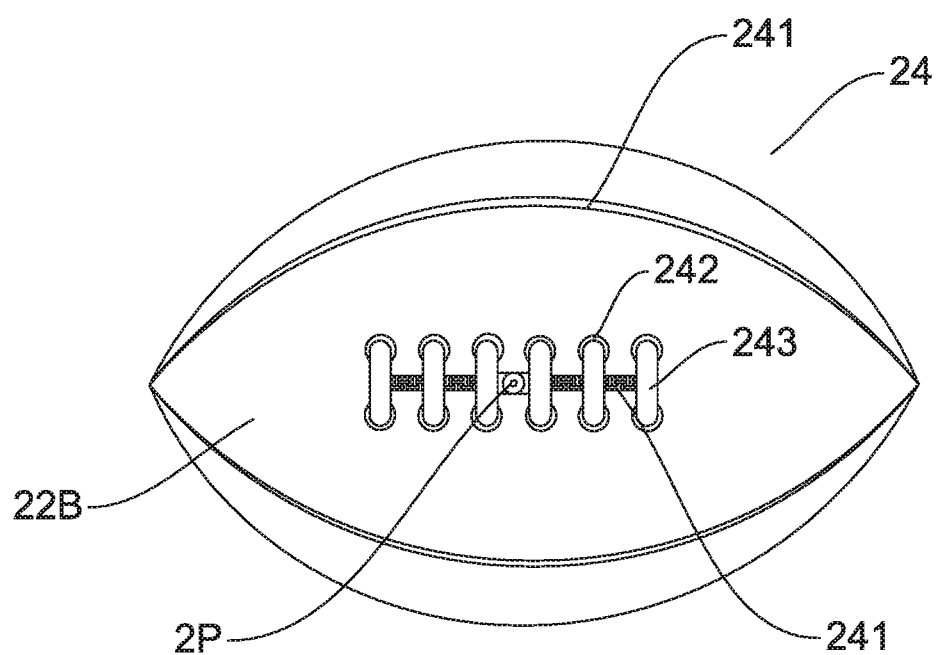
FIG. 3 is a perspective view showing a football being surface processed according to another preferred embodiment of the present invention.

Referring to FIG. 3, the fluidic surface material 4 is formed on the spherical portion 22 and the medium layer 3 based on spheres of different shapes and sizes. Preferably, the sphere 23 is surface processed. Taking a football 24 for example, as shown in FIG. 3, the solid layer 22B has multiple openings 242 formed thereon, and multiple decorative straps 243 are manually adhered or sewed on the multiple openings 242 respectively, wherein a decoration face 241 is formed on the football 24, thus enhancing aesthetic appearance.

Manually adhering or sewing the multiple decorative straps 243 on the multiple openings 242 respectively is a prior art, so further remarks are omitted. Preferably, the sphere 23 is surface processed in various manners.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A method of manufacturing a seamless inflatable ball comprising steps of:
   1) inflating air into a preformed body through an inflation nozzle so as to form a spherical body and covering a medium layer on the spherical body so as to form a semi-finished part, wherein the medium layer is made of weaving material with a predetermined thickness, and wherein the semi-finished part is configured to absorb fluid on the medium layer;
   2) forming a fluidic surface material on the medium layer of the semi-finished part in a predetermined thickness so as to produce a spherical portion with a covering layer;
   3) placing the spherical portion with the covering layer into two ball molds wherein the two ball molds have multiple indentations or patterns formed on two inner walls of the two ball molds respectively, such that the spherical portion is clamped in the two ball molds; and
   4) partially discharging air out of the spherical body and inflating the air into the spherical body repeatedly, via an air intake through the ball molds corresponding to an inflation nozzle of the preformed body, so as to expand the spherical portion and to force the two inner walls of the ball molds by using the spherical portion, such that the fluidic surface material is pushed into multiple gaps of the medium layer, and, after the fluidic surface material is dried or is solidified to form a solid layer on the spherical portion, the spherical portion is removed from the two ball molds, thus forming a sphere.

2. The method as claimed in claim 1, wherein in the step 1), the weaving material of the medium layer of the semi-finished part is yarns which are winded or weaved in a fabric or in a mesh shape on the semi-finished part.

3. The method as claimed in claim 1, wherein in the step 1), the weaving material of the medium layer of the semi-finished part is yarns which are adhered or covered in a fabric or in a mesh shape on the semi-finished part.

4. The method as claimed in claim 1, wherein in the step 2), the fluidic surface material is formed on the medium layer in any one of a soaking manner, a spraying manner, and a coating manner.

5. The method as claimed in claim 1, wherein in the step 3), the covering layer is pressed or heated by the two ball molds wherein the covering layer is shaped and is connected with the medium layer securely.

\* \* \* \* \*